United States Patent
Stevens

(10) Patent No.: US 10,118,097 B2
(45) Date of Patent: Nov. 6, 2018

(54) SYSTEMS AND METHODS FOR AUTOMATED IMAGE PROCESSING FOR IMAGES WITH SIMILAR LUMINOSITIES

(71) Applicant: Electronic Arts Inc., Redwood City, CA (US)

(72) Inventor: Karen Elaine Stevens, Maitland, FL (US)

(73) Assignee: ELECTRONIC ARTS INC., Redwood City, CA (US)

( * ) Notice: Subject to any disclaimer, the term of this patent is extended or adjusted under 35 U.S.C. 154(b) by 202 days.

(21) Appl. No.: 15/283,071

(22) Filed: Sep. 30, 2016

(65) Prior Publication Data

US 2018/0043257 A1   Feb. 15, 2018

Related U.S. Application Data

(60) Provisional application No. 62/372,687, filed on Aug. 9, 2016.

(51) Int. Cl.
| | |
|---|---|
| A63F 13/52 | (2014.01) |
| A63F 13/25 | (2014.01) |
| G06T 11/00 | (2006.01) |
| G06T 11/60 | (2006.01) |

(52) U.S. Cl.
CPC .............. *A63F 13/52* (2014.09); *A63F 13/25* (2014.09); *G06T 11/001* (2013.01); *G06T 11/60* (2013.01)

(58) Field of Classification Search
CPC .............. A63F 13/25; A63F 13/52; G06T 5/00
USPC .................................................... 463/30, 31
See application file for complete search history.

(56) References Cited

U.S. PATENT DOCUMENTS

| | | | | |
|---|---|---|---|---|
| 9,826,898 | B1* | 11/2017 | Jin | A61B 3/066 |
| 9,984,658 | B2* | 5/2018 | Bonnier | G09G 5/04 |
| 2008/0316202 | A1 | 12/2008 | Zhou et al. | |
| 2016/0071470 | A1* | 3/2016 | Kim | G09G 3/3607 |
| | | | | 345/690 |
| 2016/0217723 | A1* | 7/2016 | Kim | G09G 3/2003 |
| 2017/0301310 | A1* | 10/2017 | Bonnier | G09G 5/04 |
| 2017/0301316 | A1* | 10/2017 | Farell | G09G 5/363 |

OTHER PUBLICATIONS

Avenali, Adam, "Color Vision Deficiency and Video Games", The Savannah College of Art and Design, Mar. 2013.*

(Continued)

*Primary Examiner* — Michael Cuff

(74) *Attorney, Agent, or Firm* — Knobbe, Martens, Olson & Bear, LLP

(57) ABSTRACT

Embodiments of systems and methods for automated image processing to improve visibility of similar luminosities in a digital media application are disclosed. The systems and methods can determine a Daltonization value based on the color palette of a frame in the digital media and modify a local contrast parameter and a local brightness parameter of the frame by applying an enhanced Daltonization process to the frame. The enhanced Daltonization technique can create a color shift in the frame. In some embodiments, after the frame is optimally Daltonized, the local brightness and contrast parameters are rebalanced to shift colors back to light hues to compensate for the initial shift to darker colors. The systems and methods can return the optimized frame to a colorblind person for view.

20 Claims, 11 Drawing Sheets

(9 of 11 Drawing Sheet(s) Filed in Color)

(56) References Cited

OTHER PUBLICATIONS

Anagnostopoulos et al., "Intelligent modification for the daltonization process", International Conference on Computer Vision Published in 2007 by Applied Computer Science Group of digitized paintings.*
Badlani et al., "A Novel Technique for Modification of Images for Deuteranopic Viewers", May 2016.*
Halder et al., "Image Color Transformation for Deuteranopia Patients using Daltonization", IOSR Journal of VLSI and Signal Processing (IOSR-JVSP) vol. 5, Issue 5, Ver. I (Sep.-Oct. 2015), pp. 15-20.*
Belytschko et al., "Assumed strain stabilization of the eight node hexahedral element," Computer Methods in Applied Mechanics and Engineering, vol. 105(2), pp. 225-260 (1993), 36 pages.
Belytschko et al., Nonlinear Finite Elements for Continua and Structures, Second Edition, Wiley (Jan. 2014), 727 pages (uploaded in 3 parts).
Chao et al., "A Simple Geometric Model for Elastic Deformations", 2010, 6 pgs.
Cook et al., Concepts and Applications of Finite Element Analysis, 1989, Sections 6-11 through 6-14.
Cournoyer et al., "Massive Crowd on Assassin's Creed Unity: AI Recycling," Mar. 2, 2015, 55 pages.
Dick et al., "A Hexahedral Multigrid Approach for Simulating Cuts in Deformable Objects", IEEE Transactions on Visualization and Computer Graphics, vol. X, No. X, Jul. 2010, 16 pgs.
Diziol et al., "Robust Real-Time Deformation of Incompressible Surface Meshes", to appear in Proceedings of the 2011 ACM SIGGRAPH/Eurographics Symposium on Computer Animation (2011), 10 pgs.
Geijtenbeek, T. et al., "Interactive Character Animation using Simulated Physics", Games and Virtual Worlds, Utrecht University, The Netherlands, The Eurographics Association 2011, 23 pgs.
Georgii et al., "Corotated Finite Elements Made Fast and Stable", Workshop in Virtual Reality Interaction and Physical Simulation VRIPHYS (2008), 9 pgs.
Han et al., "On-line Real-time Physics-based Predictive Motion Control with Balance Recovery," Eurographics, vol. 33(2), 2014, 10 pages.
Irving et al., "Invertible Finite Elements for Robust Simulation of Large Deformation", Eurographics/ACM SIGGRAPH Symposium on Computer Animation (2004), 11 pgs.
Kaufmann et al., "Flexible Simulation of Deformable Models Using Discontinuous Galerkin FEM", Oct. 1, 2008, 20 pgs.
Kavan et al., "Skinning with Dual Quaternions", 2007, 8 pgs.
Kim et al., "Long Range Attachments—A Method to Simulate Inextensible Clothing in Computer Games", Eurographics/ACM SIGGRAPH Symposium on Computer Animation (2012), 6 pgs.
Komura et al., "Animating reactive motion using momentum-based inverse kinematics," Computer Animation and Virtual Worlds, vol. 16, pp. 213-223, 2005, 11 pages.
Lee, Y. et al., "Motion Fields for Interactive Character Animation", University of Washington, Bungie, Adobe Systems, 8 pgs.
Levine, S. et al., "Continuous Character Control with Low-Dimensional Embeddings", Stanford University, University of Washington, 10 pgs.
Macklin et al., "Position Based Fluids", to appear in ACM TOG 32(4), 2013, 5 pgs.
McAdams et al., "Efficient Elasticity for Character Skinning with Contact and Collisions", 2011, 11 pgs.
Muller et al., "Meshless Deformations Based on Shape Matching", SIGGRAPH 2005, 29 pgs.
Muller et al., "Adding Physics to Animated Characters with Oriented Particles", Workshop on Virtual Reality Interaction and Physical Simulation VRIPHYS (2011), 10 pgs.
Muller et al., "Real Time Dynamic Fracture with Columetric Approximate Convex Decompositions", ACM Transactions of Graphics, Jul. 2013, 11 pgs.
Muller et al., "Position Based Dymanics", VRIPHYS 2006, Oct. 21, 2014, Computer Graphics, Korea University, 23 pgs.
Nguyen et al., "Adaptive Dynamics With Hybrid Response," 2012, 4 pages.
O'Brien et al., "Graphical Modeling and Animation of Brittle Fracture", GVU Center and College of Computing, Georgia Institute of Technology, Reprinted from the Proceedings of ACM SIGGRAPH 99, 10 pgs.
Orin et al., "Centroidal dynamics of a humanoid robot," Auton Robot, vol. 35, pp. 161-176, 2013, 18 pages.
Parker et al., "Real-Time Deformation and Fracture in a Game Environment", Eurographics/ACM SIGGRAPH Symposium on Computer Animation (2009), 12 pgs.
Rivers et al., "FastLSM: Fast Lattice Shape Matching for Robust Real-Time Deformation", ACM Transactions on Graphics, vol. 26, No. 3, Article 82, Publication date: Jul. 2007, 6 pgs.
Rungjiratananon et al., "Elastic Rod Simulation by Chain Shape Matching withTwisting Effect" SIGGRAPH Asia 2010, Seoul, South Korea, Dec. 15-18, 2010, ISBN 978-1-4503-0439-9/10/0012, 2 pgs.
Seo, et al., "Compression and Direct Manipulation of Complex Blendshape Models." Dec. 2011, in 10 pages.
Sifakis, Eftychios D., "FEM Simulations of 3D Deformable Solids: A Practioner's Guide to Theory, Discretization and Model Reduction. Part One: The Classical FEM Method and Discretization Methodology", SIGGRAPH 2012 Course, Version 1.0 [Jul. 10, 2012], 50 pgs.
Stomakhin et al., "Energetically Consistent Invertible Elasticity", Eurographics/ACM SIGGRAPH Symposium on Computer Animation (2012), 9 pgs.
Treuille, A. et al., "Near-optimal Character Animation with Continuous Control", University of Washington, 2007, 7 pgs.
Vaillant et al., "Implicit Skinning: Real-Time Skin Deformation with Contact Modeling", (2013) ACM Transactions on Graphics, vol. 32 (n° 4). pp. 1-11. ISSN 0730-0301, 12 pgs.
Wu et al., "Goal-Directed Stepping with Momentum Control," Eurographics/ ACM SIGGRAPH Symposium on Computer Animation, 2010, 6 pages.

* cited by examiner

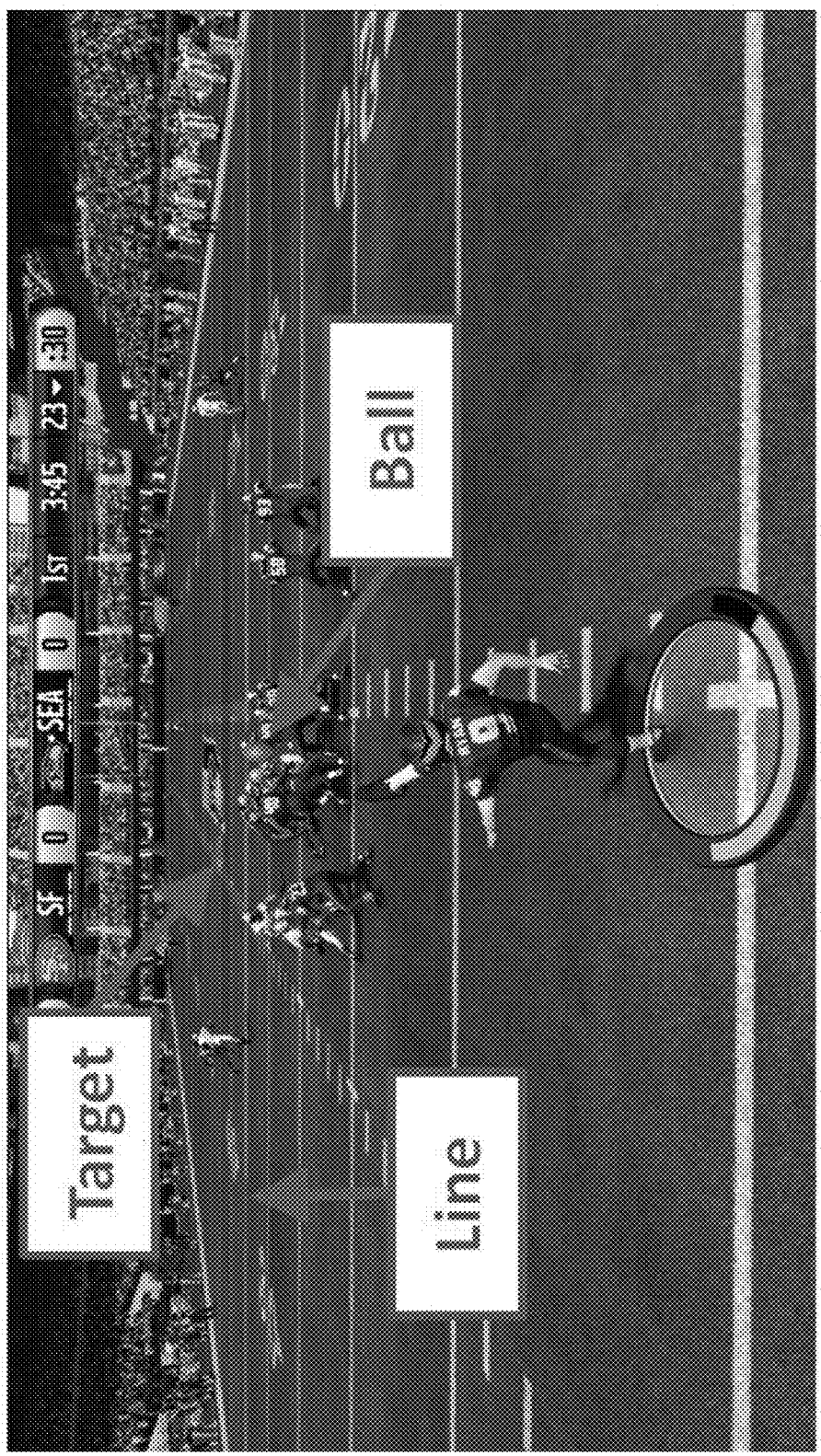

Normal View

Protanopia View

Enhanced View

US 10,118,097 B2

SYSTEMS AND METHODS FOR AUTOMATED IMAGE PROCESSING FOR IMAGES WITH SIMILAR LUMINOSITIES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

People with colorblindness (also known as color vision deficiency) have decreased ability to perceive and differentiate colors. Colorblindness may be caused by a mutation that may result in a cone partially or fully overlapping with another cone, which may affect multiple cones. In some cases, a person may be missing one or more cones. The three types of color sensing cones in the eyes include short-wavelength S cones, medium-wavelength M cones, and long-wavelength L cones. In a digital media application (such as a video game), people with colorblindness often cannot observe subtle differences between two objects when these two objects have similar luminosities. As a result, the ability to perceive and interact with the content of the digital media application may be negatively affected.

SUMMARY OF EMBODIMENTS

The systems, methods, and devices of this disclosure each have several innovative aspects, no single one of which is solely responsible for various desirable attributes disclosed herein.

One embodiment discloses a method for automated image processing to improve visibility of colors having similar luminosities in a digital media application, the method comprising: under control of a computing device comprising a hardware processor configured to execute software instructions: identifying an image frame of a virtual environment in a digital media application; identifying an initial value of a contrast and an initial value of a brightness of the image frame; determining a Daltonization strength, a local contrast parameter, and a local brightness parameter of the image frame; adjusting the contrast and the brightness of at least a portion of the image frame based on the local contrast parameter and the local brightness parameter; applying a modified Daltonization process using, at least, the Daltonization strength to modify color values of the image frame, wherein the Daltonization process creates a modified image frame; adjusting the contrast and the brightness of at least a portion of the modified image frame to create an enhanced image frame; and generating instructions for rendering the enhanced image frame in the digital media application.

Another embodiment discloses a system for automated image processing to improve visibility of colors having similar luminosities in a digital media application, the system comprising: a hardware processor configured to execute software instructions configured to: identify an image frame of a virtual environment in a digital media application; identify an initial value of a contrast and an initial value of a brightness of the image frame; access a Daltonization strength, a local contrast parameter, and a local brightness parameter of the image frame; adjust the contrast and brightness of at least a portion of the image frame based, at least in part, on the local contrast parameter and the local brightness parameter; apply a modified Daltonization process using, at least, the Daltonization strength to modify color values of the image frame, wherein the Daltonization process creates a modified image frame; adjust the contrast and the brightness of at least a portion of the modified image frame to create an enhanced image frame; and render the enhanced image frame within the digital media application; and generate instructions for display of the enhanced image frame within a graphical user interface of the digital media application.

Another embodiment discloses a non-transitory computer-readable medium having stored thereon a computer program, the computer program including executable instructions which configure a hardware processor to: identify an image frame of a virtual environment in a digital media application; identify an initial value of a contrast and an initial value of a brightness of the image frame; access a Daltonization strength, a local contrast parameter, and a local brightness parameter of the image frame; adjust the contrast and the brightness of at least a portion of the image frame based, at least in part, on the local contrast parameter and the local brightness parameter; apply a modified Daltonization process using, at least, the Daltonization strength to modify color values of the image frame, wherein the Daltonization process creates a modified image frame; adjust the contrast and the brightness of at least a portion of the modified image frame to create an enhanced image frame; and render the enhanced image frame within the digital media application; and generate instructions for display of the enhanced image frame within a graphical user interface of the digital media application.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof The patent or application file contains at least one drawing executed in color. Copies of this patent or patent application publication with color drawings will be provided by the Office upon request and payment of the necessary fee.

FIG. 4B illustrates an example embodiment of the screenshot of FIG. 4A as perceived by a person with protanopia colorblindness after post-processing executes an enhanced Daltonization technique.

DETAILED DESCRIPTION OF EMBODIMENTS

Overview

Figure 1:
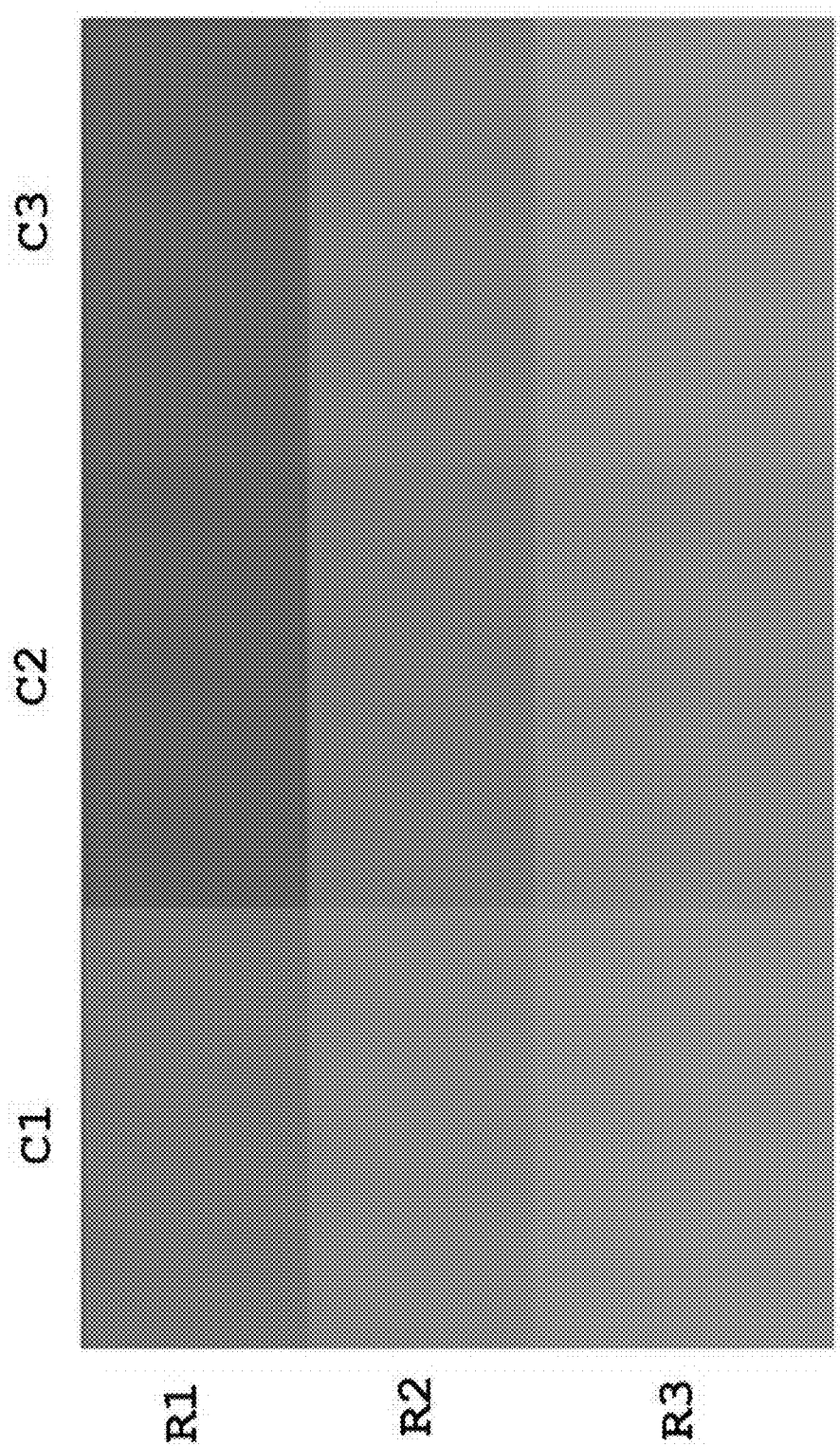
FIG. 1 illustrates an embodiment of rows of colors in an enhanced Daltonization view, a normal Daltonization view, and a normal undaltonized view.

Daltonization is a computer implemented colorblind accessibility technique designed to shift colors away from where the eye is weak to where the eye is strong, thereby allowing people with color vision deficiencies to distinguish details that they are otherwise unable to perceive. Daltonization uses red-blue-green (RBG) pixel values of a digital image or a video frame to create, "LMS" values. The LMS values represent the long range (L), medium range (M), and short range (S) wavelengths perceivable by cone cells in the retina of the human eye. Daltonization shifts the LMS values to color values that are more perceivable to a colorblind person. These color shifted LMS values may also be referred to as L'M'S'. The L'M'S' can be used create a color shifted pixel value, R'G'B'. When pixels in a digital image or digital video frame have been color shifted, a color shifted frame is produced and is then displayed to a colorblind user. The color shifted frame may also be referred to as a Daltonized frame.

Daltonization can be applied to digital images and videos such as photographs and films of the real world. Natural lighting in the real world creates varying contrast and brightness between objects in the real world such that the colors of the objects typically do not appear to be very bright and vivid. Accordingly, in the digital images and film of the real world, there are often perceivable differences in the brightness and contrast between objects. These differences are very important for a colorblind person's ability to distinguish color. Daltonization technique utilizes these perceivable differences to Daltonize photographs and films to distinguish and shift colors from where the eye is weak to where the eye is strong.

Daltonization can also be applied to digital media application such as digitally rendered and animated media applications (for example, video games, mobile phone applications, animated films, and the like), graphical user interfaces (such as, a button, an icon, text, backgrounds, and the like), and so on. Most digital media applications are composed of color palettes containing similar luminosities and their environments are typically rendered using simulated lighting conditions that are ideal for displaying similar luminosities (such as, for example, similar fill or brightness) as bright and vividly as possible. However, applying Daltonization to digital media applications can be problematic because Daltonization lacks brightness and contrast adjustment since it was not designed with digital media applications in mind. As a result, Daltonizing digital media can often shift the color palette such that it may create color clash for colors of similar luminosities, which can cause the digital objects that looked distinct to become indistinguishable for a colorblind person.

One solution to this problem is to color swap particular aspects of the digital media, such as text, icons, and status bars. Though this can provide improved visibility on readable information and various identifiers, it fails to encompass a colorblind player or user's entire view the digital media which could still include similar luminosities. Another solution is to implement a color swapping accessibility feature that can drastically change the color palette of the digital media and can require a user to manually adjust the intensity of swapped colors. This solution can create the burden of readjusting the color intensity each time a player or user enters a new map or area (such as in a video game) to compensate for the different lighting conditions.

Embodiment of the enhanced Daltonization technique described herein is directed to solving one or more of these problems. Embodiment of the enhanced Daltonization technique can adjust local contrast and brightness prior to or after Daltonization to advantageously reduce color clash and to preserve the accuracy of color shift generated by Daltonization. In some implementations, the enhanced Daltonization technique can also modify the Daltonization strength while adjusting the color shift to produce a more perceivable result for a colorblind person.

As an example, prior to creating a Daltonized pixel, the enhanced Daltonization technique can modify local brightness and contrast parameters of the pixel to cause similar luminosities to appear darker and more distinguishable for Daltonization. The enhanced Daltonization technique can then apply a modified Daltonization algorithm after the local brightness and contrast parameters are adjusted. The modified Daltonization algorithm may include a reduction in Daltonization strength relative to the particular color palette of the digital media application to which it is being applied. The reduction in Daltonization strength can help to reduce the occurrences in which the color of a pixel is shifted closer to the color white. After the modified Daltonization algorithm is applied, the enhanced Daltonization technique can further rebalance the local brightness and contrast parameters so as to shift the pixel color to a lighter hue prior to returning Daltonized colors. The rebalancing of local contrast and brightness can make each pixel in a rendered frame brighter and can be beneficial due to the initial change in values of both contrast and brightness at the beginning the process, which causes each pixel to be darker.

The enhanced Daltonization technique can be applied to digital media applications such as the background and user interface elements of a video game, or a portion of the user interface such as a virtual button or a player or user. The enhanced Daltonization technique can also be customized based on the types of colorblindness. For example, the coefficient associated with the strength of each respective RGB color and/or the local brightness and contrast parameters may be adjusted based on different types of colorblindness. The Daltonization strength and contrast parameters may be pre-set (such as by a game developer) or may be generated dynamically based on the user's characteristics (such as degree of colorblindness).

The enhanced Daltonization technique can be applied to any color palette and can occur at any time, such as in a separate rendering pass or programmed within a user interface, thus providing flexibility for implementation throughout a variety of digital media applications. For example, the enhanced Daltonization technique can be applied during the post-processing stage of a video game. The enhanced Daltonization technique can also be incorporated as part of the computer code for a user interface. If the optimized Daltonization technique is executed as part of the user interface code or during rendering, the enhanced Daltonization pixels may be rendered, at least in part, by the Graphic Processing Unit (GPU). Additionally or alternatively, a central processing unit (CPU) can execute the enhanced Daltonization technique and render the enhanced Daltonization pixels in their entirety or in part.

There are generally two general categories of partial colorblindness: (1) red-green colorblindness where there is difficulty distinguishing between red and green (which includes protanopia and deuteranopia); and (2) blue-yellow colorblindness where there is difficulty distinguishing between blue and yellow (which includes tritanopia).

Example Embodiments of the Enhanced Daltonization Technique

Figure 2:
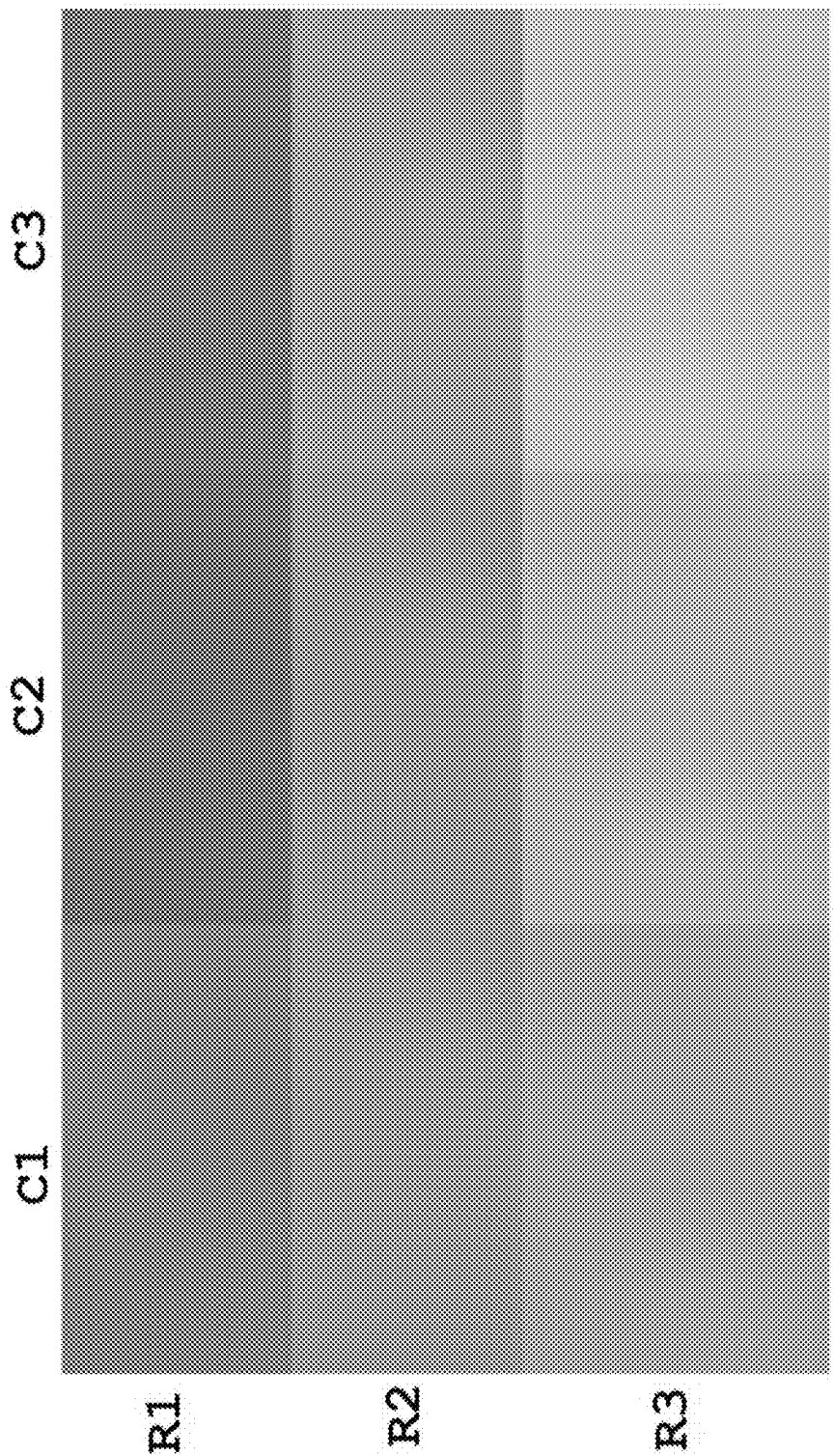
FIG. 2 illustrates an embodiment of the view of FIG. 1 as perceived by a person with protanopia colorblindness.
Figure 3:
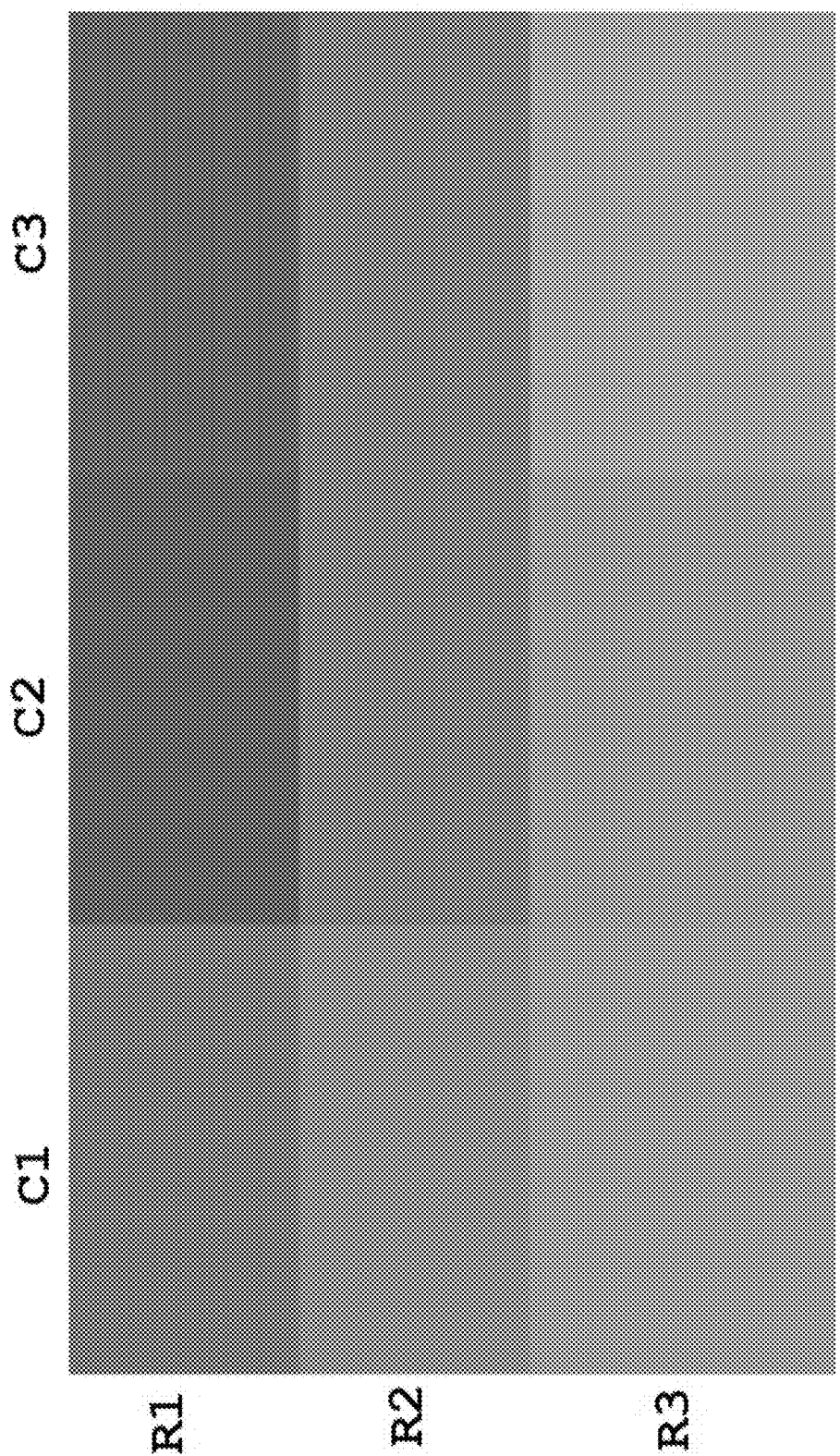
FIG. 3 illustrates an embodiment of the view of FIG. 1 as perceived by a person with deuteranopia colorblindness.

FIGS. 1-3 illustrate example embodiments of applications of the enhanced Daltonization technique and the normal Daltonization technique to a digital image of blocks composed of a green color palette of similar luminosities.

FIG. 1 illustrates three rows of green colors in an enhanced Daltonization view R1, a normal Daltonization view, R2, and an undaltonized view R3, respectively, as perceived by a person who is not colorblind.

Row R3 illustrates an undaltonized row of three shades of the color green. The boxes R3C1, R3C2, and R3C3 represent green colors that have similar luminosities. The Daltonization technique and the enhanced Daltonization technique can be applied to these three boxes to shift the LMS values to values that are more perceivable to a colorblind person. The enhanced Daltonization technique can also modify the contrast and brightness before and after applying the color shift to improve the ability to distinguish colors with similar luminosity. The enhanced Daltonization technique can also apply a modified Daltonization strength (such as a reduced Daltonization strength) during the color shift. In this particular example, the Daltonization strength is based on the green color palette.

Row R1 illustrates the colors in row R3 after being processed by the enhanced Daltonization technique while Row R2 illustrates the colors in row R3 after being processed by a normal Daltonization technique. As shown in FIG. 1, the colors in R1 may appear to be darker than the colors in R2.

FIG. 2 illustrates an embodiment of the view of FIG. 1 as perceived by a person with protanopia colorblindness and showing the difficulty distinguishing among red, green and yellow. In this example, the normal Daltonization row (R2) encounters a color clashing instance between boxes R2C1 and R2C2. However, the enhanced Daltonized row (R1) can show greater distinctions among all three colors. In this embodiment, the enhanced Daltonization technique modified the contrast among the three colors prior to Daltonization and reduced the strength in the Daltonization. As a result, the row R1 allows the colors to appear "darker" and more perceivable to a person with protanopia colorblindness than that of rows R2 and R3.

Although in this example, the undaltonized row (R3) does not appear to have color clash for a person with protanopia, the enhanced Daltonization technique can successfully reduce the luminance and provide an improved and accessible view of all three colors across row R1.

FIG. 3 illustrates an embodiment of the view of FIG. 1 as perceived by a person with deuteranopia colorblindness and showing the difficulty distinguishing among red, green and yellow. There are two color clashing instances shown in FIG. 3. The first color clashing instance occurs in the undaltonized row, R3, between blocks R3C1 and R3C2. The second color clashing instance occurs in the row R2 with normal Daltonization applied between blocks R2C2 and R2C3. This figure exemplifies a case in which a colorblind viewer is unable to distinguish two colors under an undaltonized condition and after the colors have been processed by a normal Daltonization technique. In particular, although the normal Daltonization technique allows the clashing colors R3C1 and R3C2 to become perceivable as shown in boxes R2C1 and R2C2, the normal Daltonization technique can create a new color clash between boxes R2C2 and R2C3.

However, as shown in row R1, the enhanced Daltonization technique can successfully provide distinctions to color boxes R1C1, R2C2, and R3C3, and therefore improve accessibility by a colorblind person with deuteranopia.

Although the examples in FIGS. 1 through 3 are described with reference to handling similar luminosities in the views for a person with protanopia (shown in FIG. 2) and a person with deuteranopia (shown in FIG. 3). The enhanced Daltonization can also work well for a person with tritanopia (where there is difficulty distinguishing between blue and yellow) because it can also account for local brightness and contrast prior to applying the modified Daltonization algorithm for tritanopia. In addition, many real world examples of digital media applications are not as simplistic as the examples presented in FIGS. 1 through 3. Typically, digital media is fairly complex and consists of a variety of colored objects in a given scene. As a result, the Daltonization strength chosen for a given digital media application can be unique to its color palette.

Example Embodiments of the Enhanced Daltonization Technique in a Video Game

Figure 4A:
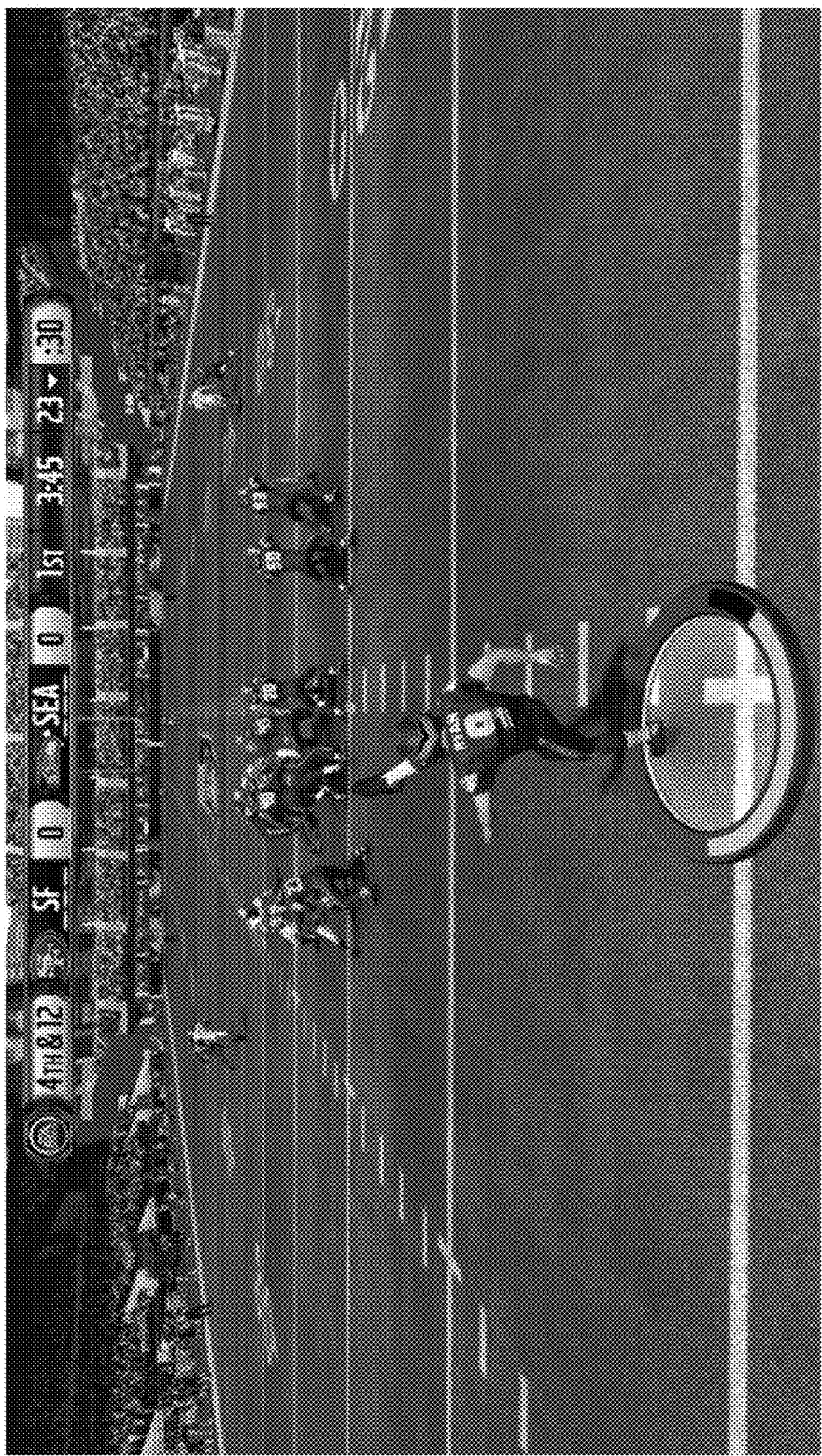
FIG. 4A illustrates an example embodiment of a screenshot of a video game as perceived by a person with protanopia colorblindness.

FIGS. 4A and 4B illustrate an example of applying the enhanced Daltonization technique to a video game. In some embodiments, the enhanced Daltonization technique can be applied to the whole video game, such as the user interface and the background (instead of a portion of the user interface). In some instances, enhanced Daltonization may be applied to the background or user interface elements. Applying the enhanced Daltonization can, for example, be particularly beneficial to avoid blending of some user interface elements, where the enhanced Daltonization technique was applied, into the background of the video game, where the enhanced Daltonization technique was not applied.

FIG. 4A illustrates an example embodiment of a screenshot as perceived by a person with protanopia in a video game. The video game may be a football game, such as Madden NFL. The video game may include animated objects such as a target, a ball, and a line (shown in FIG. 4B), which may be essential to the gameplay. In this example, however, the person with protanopia is unable to distinguish various objects in the screenshot of a video game. For example, the target on the field is indistinguishable when it is at a distance. The ball blends in with the other players or users in the middle of the screenshot. The first down line appears to fade in the distance. Without a clear distinction of where these objects are, a colorblind player or user is at a disadvantage when playing the game.

FIG. 4B illustrates an example embodiment of a screenshot of FIG. 4A as perceived by a person with protanopia after the video game is processed using an enhanced Daltonization technique. An improvement in the visibility of the target, the ball, and the line can been seen in this figure. Furthermore, the crowd is also more distinguishable in the enhanced Daltonization view of FIG. 4B as opposed to the undaltonized view in FIG. 4A. In some implementations, the enhanced Daltonization technique can be applied to everything in the video game. The video game can use Fast Approximate Anti-Aliasing (FXAA) or a similar algorithm to reduce edges around the objects in the video game, which can improve the quality of the video game display. The FXAA may be part of the shader code.

In this figure, the labeled boxes and arrows within the figure indicate their respective labeled objects. The labeled boxes and arrows are for reference purposes only in this embodiment. They are not part of the enhanced Daltonization algorithm and would not be seen by a player or user.

Figure 4C:
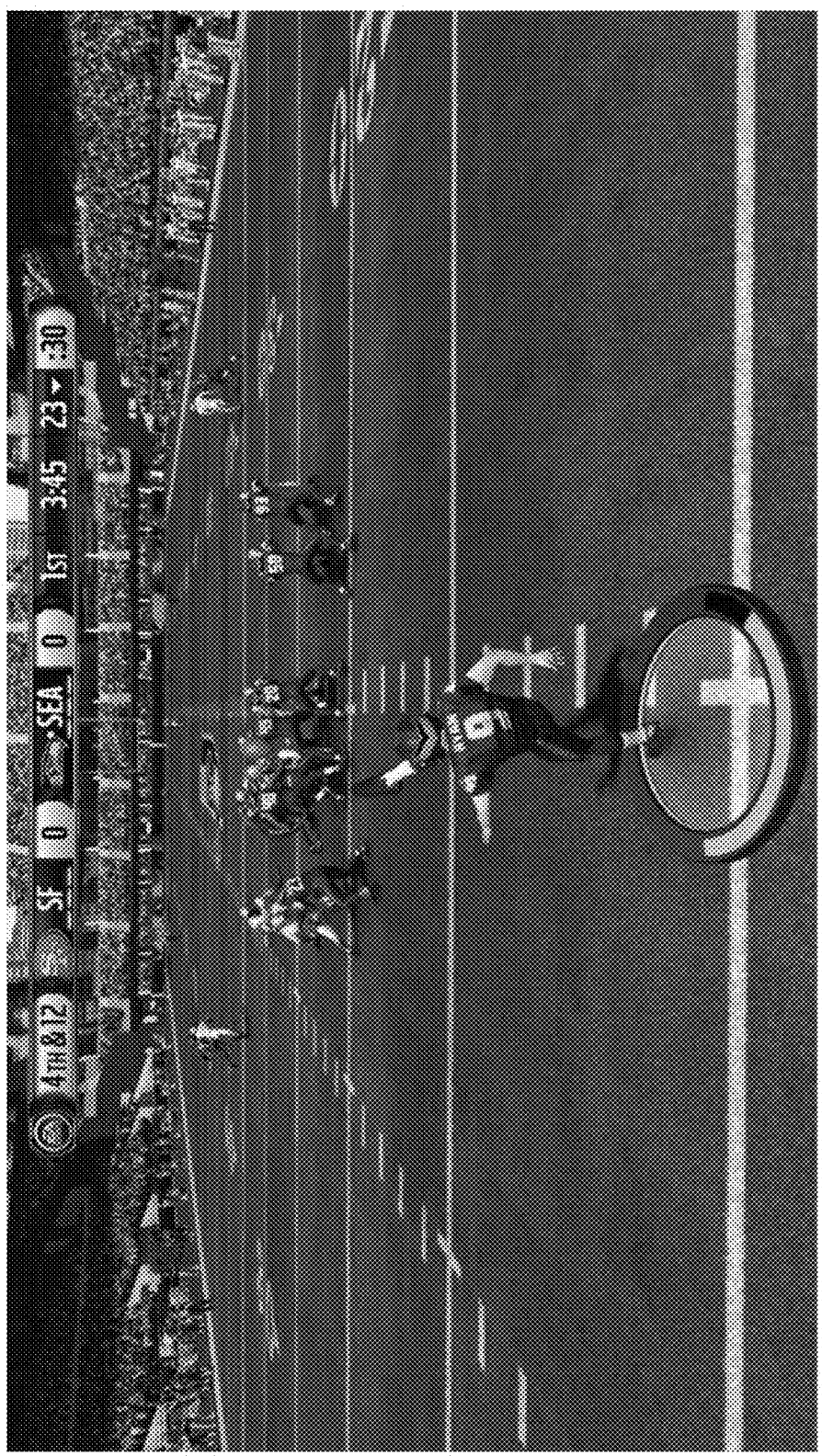
FIG. 4C illustrates an example embodiment of the screenshot of FIG. 4A as perceived by a person with normal vision after post-processing executes an enhanced Daltonization technique.

FIG. 4C illustrates an example embodiment of a screenshot of FIG. 4A as perceived by a person with normal vision after the video game is processed using an enhanced Daltonization technique. FIG. 4C demonstrates how the modified Daltonization algorithm makes use of an original color palette, and only creates subtle differences to a normal vision user. In this figure, a Daltonization strength may be chosen (for example, by a game developer) based on the color palette of the video game. Advantageously, in this implementation, most of the original color can be preserved after use of the enhanced Daltonization technique. This can allow a person with normal color vision and a person with colorblindness to both distinguish objects in the video game processed by the enhanced Daltonization technique. This implementation may be beneficial because it can eliminate issues associated with screen sharing when colorblind accessibility features are turned on. For example, when the colorblind accessibility features drastically swap colors for all objects.

Example Embodiments of Applying the Enhanced Daltonization Technique to a User Interface In some implementations, the enhanced Daltonization technique may be applied in the post-processing stage of a digital media application. For example, in a video game, it may be advantageous to apply the enhanced Daltonization technique as a post processing effect. As a post process effect, the enhanced Daltonization technique can create negligible load on runtime performance, making it a good choice for implementation. The enhanced Daltonization technique may be run entirely on a CPU, though in some instances, runtime performance would improve if the process is handled, at least in part, by a GPU.

However, the post-processing effect may not cover all portions of the digital media application. For example, when the user interface is not rendered by the main engine of a video game, the user interface features may not be affected by the post-processing application of the enhanced Daltonization technique. As a result, the enhanced Daltonization technique may be applied in other ways to create colorblind accessibility features. As an example, the enhanced Daltonization technique can be incorporated directly into the user interface code. The code comprising the enhanced Daltonization technique can be versatile enough to be applied to any place where pixels are to be rendered or processed in a digital media application.

Figure 5:
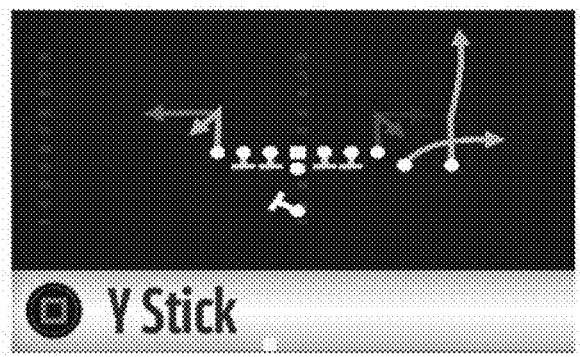
FIG. 5 illustrates an embodiment of an example implementation of an enhanced Daltonization technique within a user interface of a video game.
Figure 5:
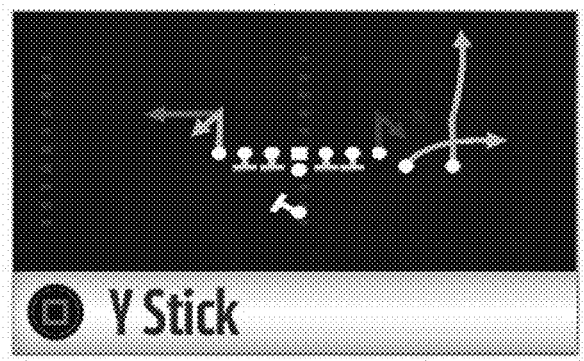
Figure 5:
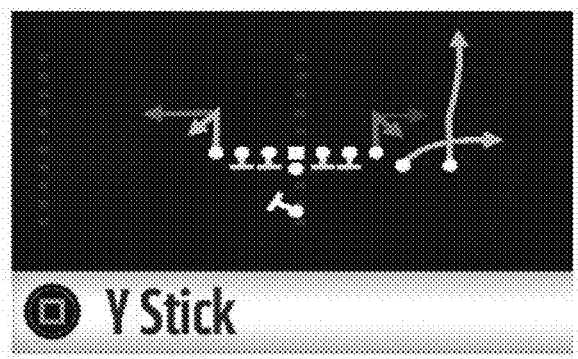

FIG. 5 illustrates an embodiment of an example implementation of an enhanced Daltonization technique within a user interface of a video game. The video game may be the same video game illustrated in FIGS. 4A-4C. The user interface may be a menu as shown in FIG. 5. In this figure, three images are depicted. The first image (top) is a normal vision view of the video game's gameplay menu. The second image (middle) illustrates the same menu in view of a person with protanopia. The third image (bottom) is the same menu processed with enhanced Daltonization in view of a person with protanopia.

This figure demonstrates how an embodiment of the enhanced Daltonization technique can function within the code of a user interface, as well as how it can make a clear distinction of the red arrows to a person with protanopia. For example, the second image illustrates the color clash between the red arrows and the background when viewed by colorblind person with protanopia.

The third image in FIG. 5 depicts the menu after the enhanced Daltonization technique has been applied, when viewed by a person with protanopia colorblindness. The enhanced Daltonization technique can shift the contrast and the brightness of the arrows and the background to create a more distinguishable contrast ratio between these two items. The differences between the second and the third image are very noticeable. The red arrows are more visible in the optimized view as grey arrows due to the enhanced Daltonization technique, enabling the colorblind player or user to more easily distinguish the gameplay elements presented in the menu. As another example, the "square" button on the bottom left of the third image is also much more prominent in comparison to the second image.

Embodiments of Example Processes of the Enhanced Daltonization Technique

Figure 6:
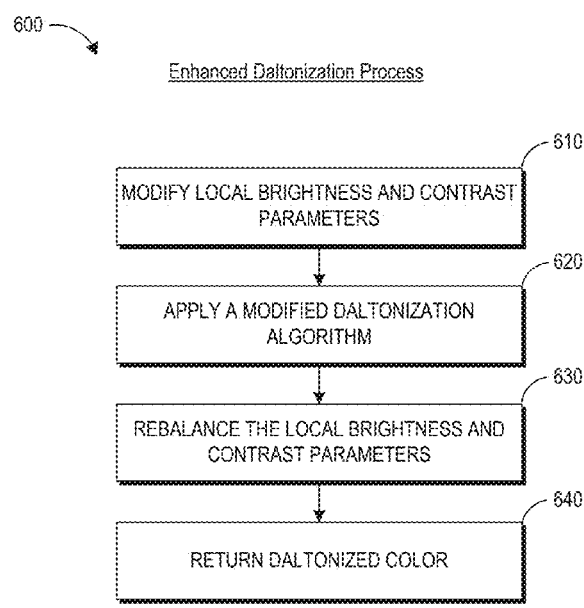
FIG. 6 illustrates embodiments of example steps of an enhanced Daltonization.

FIG. 6 illustrates embodiments of an example process of an enhanced Daltonization technique. The process 600 may be executed by the computing device 10 shown in FIG. 8.

As an example, to implement enhanced Daltonization as a post-processing effect in a video game, the following scope variables may be passed into the game:

float colorBlindProtanopiaFactor: presentation=0.0; //pass in 0 or 1 to turn on support float colorBlindDeuteranopiaFactor: presentation=0.0; //pass in 0 or 1 to turn on support float colorBlindTritanopiaFactor: presentation=0.0; //pass in 0 or 1 to turn on support float colorBlindDaltonizeFactor: presentation=0.0; //pass in 0 or 0.9 for best results float accessibilityBrightnessFactor: presentation=0.0; //zero is no effect float accessibilityContrastFactor: presentation=0.0; //zero is no effect The protanopia, deuternopia, tritanopia, or other colorblindness factors can be in-game, user-set parameters whose value modifies the color values (RGB) of a pixel. The colorBlindDaltonizeFactor can represent Daltonization strength. The Daltonization strength may be set by a game developer, although it may also be set by a game player or user in some implementations. In this example, the value 0.9 represents the best Daltonization strength relative to the color palette of the football game illustrated with reference to FIGS. 4A-5. The "best" Daltonization strength can be determined for each video game or digital media application.

The accessibilityBrightnessFactor and accessibilityContrastFactor float variables are additional support parameters which can be set by a user to allow the user to change the brightness and contrast within the game. The enhanced Daltonization technique can account for these two support parameters when applying the local contrast and brightness shift prior to applying the modified Daltonization algorithm (shown in block 620). For example, as shown in the code snippet above, a value of 0 has no effect of the brightness factor or the contrast factor.

At block 610, the process can modify local brightness and contrast parameters based on the values for the received factors. For example, the RGB values can be adjusted for local contrast and brightness. The modification at block 610 can cause the colors to be shifted to darker hues.

In the example code snippet shown below, the value 0.112 represents a local contrast shift value. Higher contrasts can fix issues that are mid-range. Lower contrast can help extremes in color. The value 0.075 is a local brightness shift value which is intended to shift the colors darker so brighter colors are less likely to clash.

```
// CALL THIS METHOD TO PROCESS COLOR
// applies brightness, contrast, and color blind settings to passed in color
float4 AccessibilityPostProcessing(float4 color)
{
//apply contrast shift for Daltonization
color.rgb = ((color.rgb − 0.5) * (1.0+colorBlindDaltonizeFactor*0.112)) + 0.5;
//apply brightness shift for Daltonization
color.rgb = 0.075*colorBlindDaltonizeFactor;
```

At block 620, after the local brightness and contrast parameters have bene shifted, the enhanced Daltonization technique can apply a modified Daltonization algorithm. An example enhanced Daltonization algorithm is illustrated with reference to the code snippet below.

```
// apply colorblind compensation algorithm
color = (Daltonize(color)*colorBlindDaltonizeFactor + color*(1.0−colorBlindDaltonizeFactor));
```

As shown in the code snippet, the modified Daltonization algorithm takes into account the Daltonization strength (through the colorBlindDaltonizeFactor). For example, the modified Daltonization algorithm can reduce the Daltonization strength to reduce the likelihood that the color of a pixel is shifted closer to the color white.

At block 630, after the pixel is Daltonized, the local brightness and contrast parameters are rebalanced to shift colors back to light hues to compensate for the initial shift to darker colors. Reducing the contrast by half and adding the brightness modifier can provide a better contrast exposure. The value 0.08 can be used to compensate for the previous values applied to the shift the local contrast and brightness prior to the modified Daltonization algorithm, thus enabling the color of a pixel to shift to a lighter hue.

```
// expose contrast
color.rgb = ((color.rgb − 0.5) * (1.0+accessibilityContrastFactor)) + 0.5;
// expose brightness & shift colors back to lighter hues
color.rgb +=
accessibilityBrightnessFactor+0.08*colorBlindDaltonizeFactor;
```

At block 640, after the local brightness has been rebalanced, the daltonized color is returned. An example of code snippet for returning the Daltonized color is shown below.

```
return color;
}
```

Example Embodiments for Customizing the Enhanced Daltonization Technique Based on a Type of Colorblindness To further improve the separation of colors, in some embodiments, the enhanced Daltonization technique can be modified to allow a game developer to independently set default values to the local contrast shift value, the local brightness shift value, and the brightness compensation value for each type of colorblindness, such as for example, protanopia, deuteranopia, or tritanopia. Default values can be implemented in the algorithm as variables in place of the previously presented numerical values for the local contrast shift value, the local brightness shift value, and the brightness compensation value (such as 0.112, 0.075, and 0.08, respectively). The code snippet below illustrates default values as scope variables for the post processing:

float colorblindBrightness: presentation=0.0; //colorblind algorithm variable, default to pass in is 0.075 float colorblindContrast: presentation=0.0; //colorblind algorithm variable, default to pass in is 0.112 float colorblindBrightnessCorrection: presentation=0.0; //colorblind algorithm variable, default to pass in is 0.08

When a player or user chooses a type of colorblind accessibility feature, the game code can pass specific default values to post processing for the particular colorblind type chosen. The code snippet below exemplifies one embodiment of the values for protanopia accessibility:

```
if(COLORBLIND_TYPE_SPECIFIC)
{
// assume default unless user has pro tanopia, then tweak. Otherwise, use defaults. Numbers are hypothetical.
    // FLOATVAR_COLOR_BLIND_BRIGHTNESS,
    FLOATVAR_COLOR_BLIND_CONTRAST, and
    FLOATVAR_COLOR_BLIND_BRIGHTNESS_CORRECTION
    are candidates for tweaking
    if(colorBlind ==
    EA::User::Football::
    ACCESSIBILITY_COLOR_BLIND_PROTANOPIA)
    {
    presentationState->
    SetFloatVar(FLOATVAR_COLOR_BLIND_BRIGHTNESS,
    0.07f);
    presentationState->
    SetFloatVar
    (FLOATVAR_COLOR_BLIND_BRIGHTNESS_CORRECTION,
    0.085f);
    }
}
```

Figure 7A:
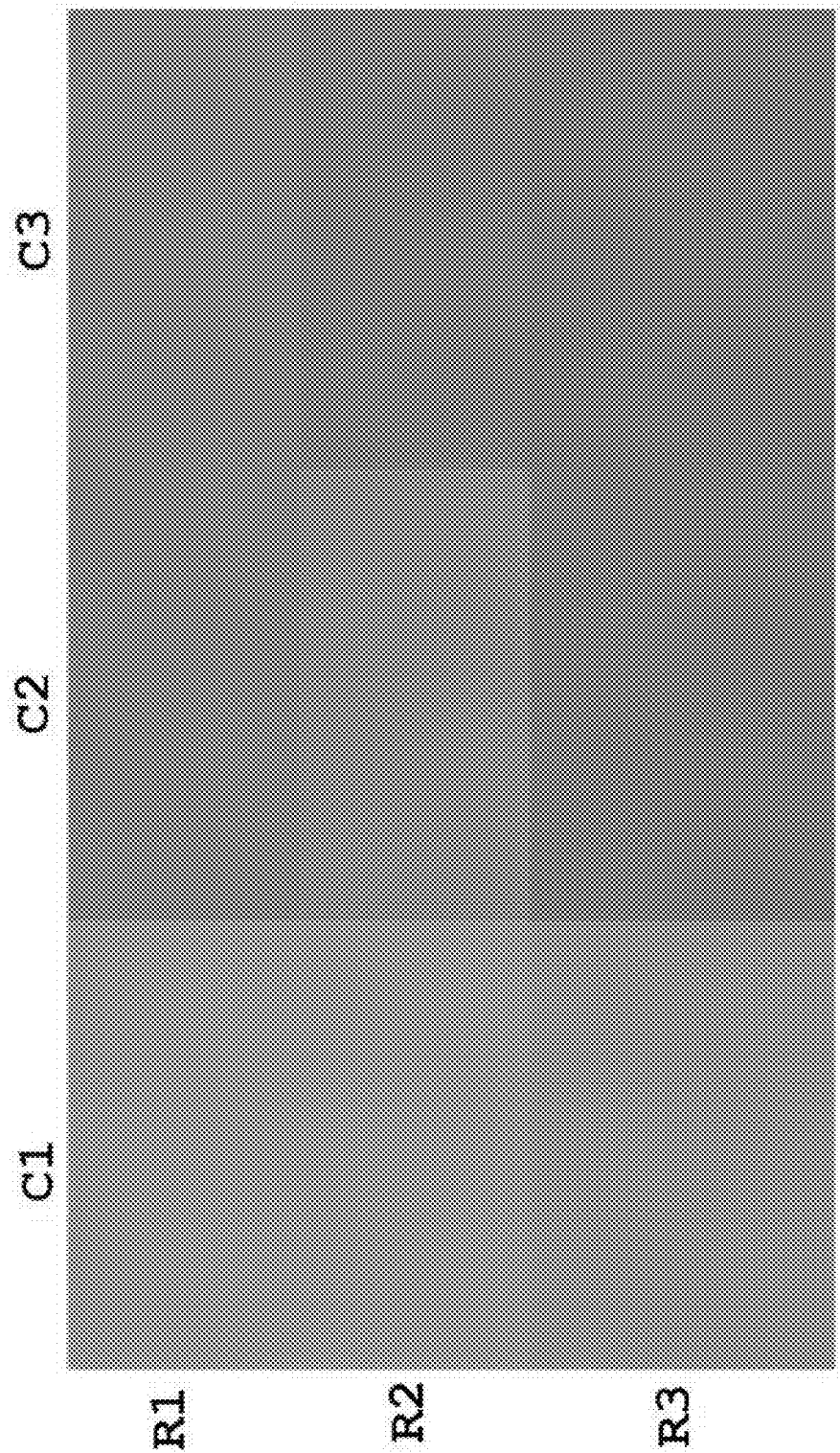
FIGS. 7A-7B illustrate example embodiments of how independently set default optimal values improve the enhanced Daltonization technique for tritanopia colorblindness.
Figure 7B:
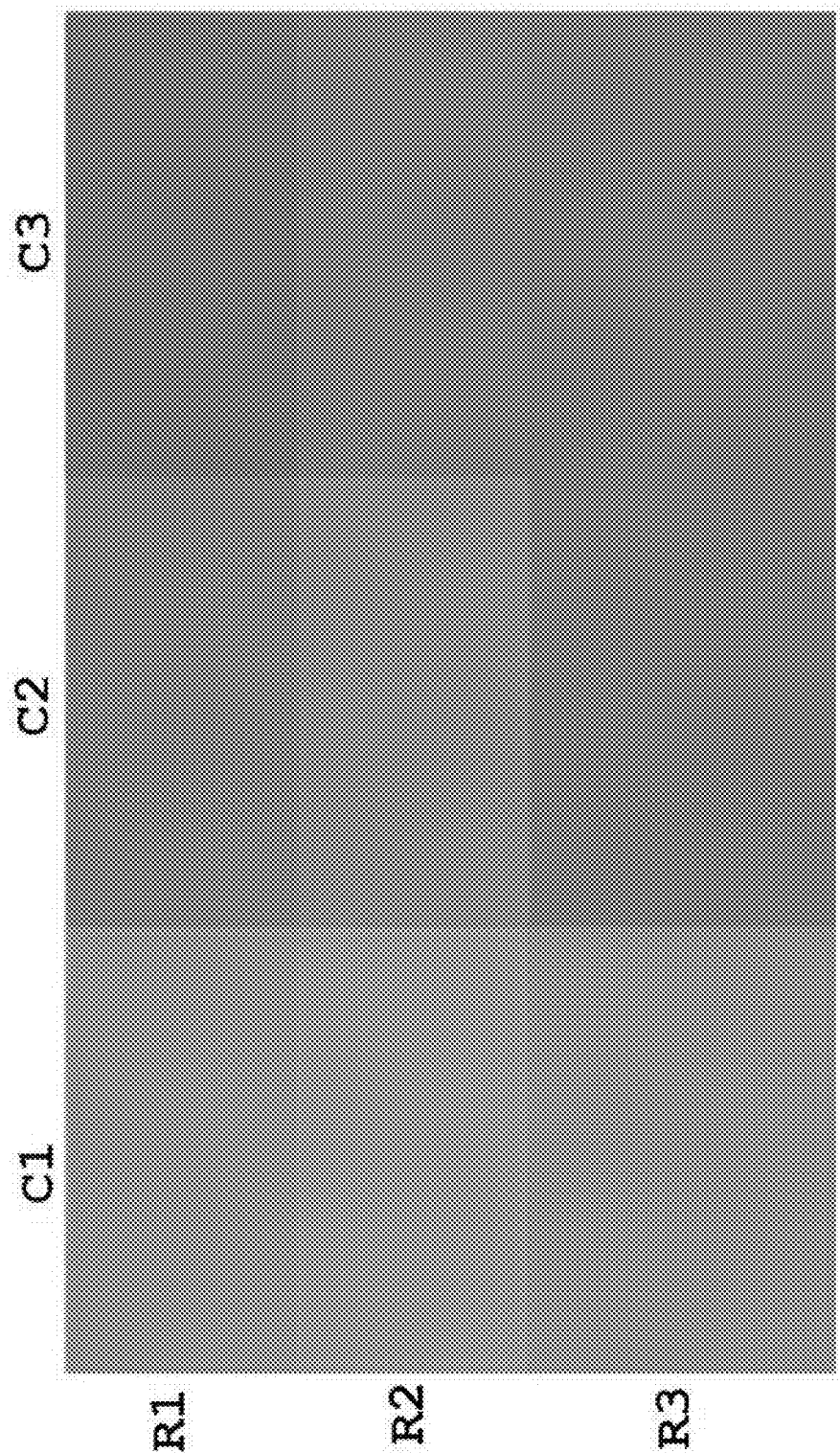

FIGS. 7A and 7B illustrate example embodiments of how independently set default values can improve the enhanced Daltonization technique for tritanopia. FIG. 7A illustrates three rows of colors in an enhanced Daltonization view R1, a normal Daltonization view R2, and an undaltonized view R3, respectively, as perceived by a person with tritanopia. In this figure, the enhanced Daltonization technique does not use the default values specifically set for tritanopia.

As shown in FIG. 7A, the colors in the boxes R3C2 and R3C3 clash. However, the enhanced Daltonization technique is still unable resolve the color clash as shown in the boxes R1C2 and R1C3. This particular color palette was chosen to illustrate an instance in which default values used in the enhanced Daltonization process can still fail to separate two colors with similar luminosities for a person with a particular type of colorblindness.

FIG. 7B illustrates an example embodiment of how independently set values solve the problem demonstrated in FIG. 7A and thereby improve the enhanced Daltonization technique. In this example, the enhanced Daltonization technique can create a better separation of colors with independently set values, as shown in row R1. The values used to correct the color clash in enhanced Daltonization as illustrated are FIG. 7B, provided in the code snippet below:

```
presentationState->SetFloatVar(FLOATVAR_COLOR_BLIND_BRIGHTNESS, 0.1f);
presentationState->SetFloatVar(FLOATVAR_COLOR_BLIND_CONTRAST, 0.01f);
presentationState->
SetFloatVar
```

```
(FLOATVAR_COLOR_BLIND_BRIGHTNESS_CORRECTION,
0.2f);
```

As described herein, default optimal values may be used for each of the three colorblind accessibility features and for processing dynamic lighting within its rendered environment in a digital media application. However, there may still be instances in which the default settings may cause enhanced Daltonization to fail to separate colors when the brightness and contrast changes in the game environment. For example, within virtual environments, the game application can often have an increased brightness and contrast so as to portray the realism of illumination. This can create an in-game change in brightness and contrast at a particular point in the virtual environment, which can cause the enhanced Daltonization technique, whose default values are set to account for the remainder of the environment, to fail when a player or user encounters a portion of the virtual environment that is outside the range of brightness and contrast associated with the default values.

To solve this problem and other instances where the default optimal settings failed to separate colors, a conditional context flag can be used to change the default values to better Daltonize a rendered pixel. For example, the conditional context flag can be implemented as part of the game code to modify the default values before they are passed to post processing. Below is a code snippet that illustrates an embodiment of a game code implementation of a conditional context flag that changes default value of contrast, though other values (such as the value for brightness) may also be changed using similar technique:

```
if(COLORBLIND_SPECIAL_CONTEXT_BEHAVIOR)
{
// FLOATVAR_COLOR_BLIND_BRIGHTNESS,
FLOATVAR_COLOR_BLIND_CONTRAST, and
FLOATVAR_COLOR_BLIND_BRIGHTNESS_CORRECTION are
candidates for tweaking
// COLORBLIND_SPECIAL_CONTEXT_BEHAVIOR is true when on
scenes known to have poor contrast and bland colors. Colorblind contrast
is automatically increased for better color separation.
presentationState-
>SetFloatVar(FLOATVAR_COLOR_BLIND_CONTRAST, 0.12f);
}
```

As illustrated above, the conditional context flag may be programmed within a digital media application, such that it is set to automatically occur at a given point within the digital media application. The conditional context flag may be a user invoked flag such as a setting within the user interface, a unique button mapping option, a trigger event or trigger object within a video game that a player or user can set off or walk into, and so forth. The game code for the conditional context flag may also return the initial default optimal values to post processing after the instance of a change in brightness and contrast has ended to seamlessly change the enhanced Daltonization technique as needed.

Overview of a Computing Device

Figure 8:
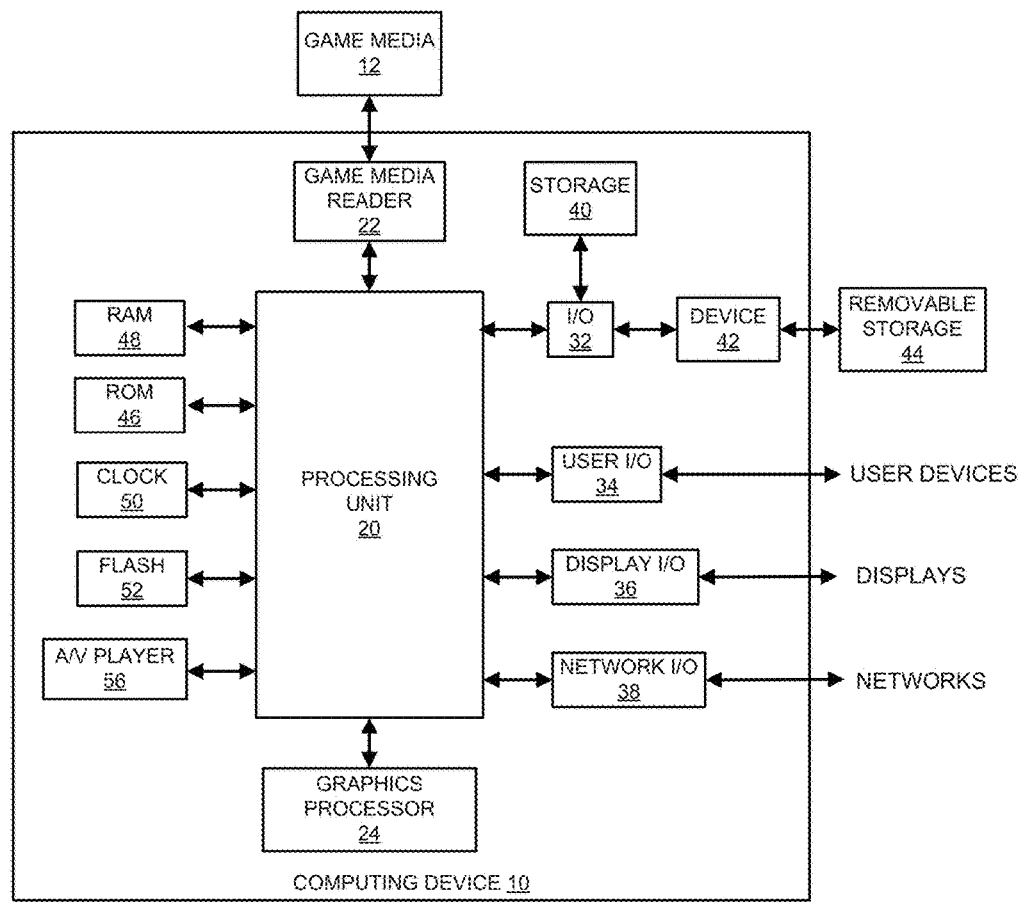
FIG. 8 illustrates an embodiment of computing device according to the present disclosure.

FIG. 8 illustrates an embodiment of a computing device 10 according to the present disclosure, which can be used to implement any of the systems and/or run the processes disclosed herein. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played or the fraud detection is performed.

User I/O 34 is used to send and receive commands between processing unit 20 and user devices, such as game controllers. In some embodiments, the user I/O 34 can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals produced by display I/O 36 comprise signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display.

The computing device 10 can also include other features that may be used with a game, such as a clock 50, flash memory 52, and other components. An audio/video player or user 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip, or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM 48 is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, and can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, state machine, or combinations of the same or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A method for automated image processing to improve visibility of colors having similar luminosities in a digital media application, the method comprising:
under control of a computing device comprising a hardware processor configured to execute software instructions:
identifying an image frame of a virtual environment in a digital media application;
identifying an initial value of a contrast and an initial value of a brightness of the image frame;
determining a Daltonization strength, a local contrast parameter, and a local brightness parameter of the image frame;
adjusting the contrast and the brightness of at least a portion of the image frame based on the local contrast parameter and the local brightness parameter;
applying a modified Daltonization process using, at least, the Daltonization strength to modify color values of the image frame, wherein the Daltonization process creates a modified image frame;
adjusting the contrast and the brightness of at least a portion of the modified image frame to create an enhanced image frame; and
generating instructions for rendering the enhanced image frame in the digital media application.

2. The method of claim 1, wherein the digital media application is a video game.

3. The method of claim 1, wherein the Daltonization strength is determined based, at least in part, on a color palette of the virtual environment.

4. The method of claim 1, wherein determining the Daltonization strength, the local contrast parameter, and the local brightness parameter of the image frame comprises:
identifying a type of colorblindness associated with a user of the digital media application; and
accessing predetermined default values for the Daltonization strength, the local contrast parameter, and the local brightness parameter associated with the type of colorblindness.

5. The method of claim 1, wherein adjusting the contrast and the brightness of the image frame based on the local contrast parameter and the local brightness parameter comprises increasing the contrast and the brightness of the image frame.

6. The method of claim 1, wherein adjusting the contrast and the brightness of the modified image frame comprises adjusting the colors of the modified image frame to a lighter hue.

7. The method of claim 1, wherein adjusting the contrast and the brightness of the modified image frame comprises restoring the contrast to the initial value of the contrast and restoring the brightness to the initial value of the brightness.

8. A system for automated image processing to improve visibility of colors having similar luminosities in a digital media application, the system comprising:
a hardware processor configured to execute software instructions configured to:
identify an image frame of a virtual environment in a digital media application;
identify an initial value of a contrast and an initial value of a brightness of the image frame;
access a Daltonization strength, a local contrast parameter, and a local brightness parameter of the image frame;
adjust the contrast and the brightness of at least a portion of the image frame based, at least in part, on the local contrast parameter and the local brightness parameter;
apply a modified Daltonization process using, at least, the Daltonization strength to modify color values of the image frame, wherein the Daltonization process creates a modified image frame;
adjust the contrast and the brightness of at least a portion of the modified image frame to create an enhanced image frame; and
render the enhanced image frame within the digital media application; and
generate instructions for display of the enhanced image frame within a graphical user interface of the digital media application.

9. The system of claim 8, wherein the graphical user interface is further configured to display the enhanced image frame of the virtual environment in the digital media application.

10. The system of claim 8, wherein the Daltonization strength is determined based at least in part on a color palette of the virtual environment.

11. The system of claim 8, wherein to access the Daltonization strength, the local contrast parameter, and the local brightness parameter of the image frame, the hardware processor is further configured to:
identify a type of colorblindness associated with a user of the digital media application; and
access default values for the Daltonization strength, the local contrast parameter, and the local brightness parameter associated with the type of colorblindness.

12. The system of claim 8, wherein to modify the contrast and the brightness of the image frame based on the local contrast parameter and the local brightness parameter, the hardware processor is further configured to increase the contrast and the brightness of the image frame.

13. The system of claim 12, wherein to adjust the contrast and the brightness of the color shifted representation of the image frame, the hardware processor is further configured to adjust the colors of the modified image frame to a lighter hue.

14. The system of claim 8, wherein the hardware processor is a graphics processing unit.

15. A non-transitory computer-readable medium having stored thereon a computer program, the computer program including executable instructions which configure a hardware processor to:
identify an image frame of a virtual environment in a digital media application;
identify an initial value of a contrast and an initial value of a brightness of the image frame;
access a Daltonization strength, a local contrast parameter, and a local brightness parameter of the image frame;
adjust the contrast and the brightness of at least a portion of the image frame based, at least in part, on the local contrast parameter and the local brightness parameter;

apply a modified Daltonization process using, at least, the Daltonization strength to modify color values of the image frame, wherein the Daltonization process creates a modified image frame;

adjust the contrast and the brightness of at least a portion of the modified image frame to create an enhanced image frame; and render the enhanced image frame within the digital media application; and generate instructions for display of the enhanced image frame within a graphical user interface of the digital media application.

16. The non-transitory computer-readable medium of claim 15, wherein the Daltonization strength is determined based at least in part on a color palette of the virtual environment.

17. The non-transitory computer-readable medium of claim 15, wherein to access the Daltonization strength, the local contrast parameter, and the local brightness parameter of the image frame, the executable instructions further cause the hardware processor to:

identify a type of colorblindness associated with a user of the digital media application; and access default values for the Daltonization strength, the local contrast parameter, and the local brightness parameter associated with the type of colorblindness.

18. The non-transitory computer-readable medium of claim 15, wherein to modify the contrast and the brightness of the image frame based on the local contrast parameter and the local brightness parameter, the executable instructions further cause the hardware processor to increase the contrast and the brightness of the image frame.

19. The non-transitory computer-readable medium of claim 15, wherein to adjust the contrast and the brightness of at least a portion of the modified image frame, the executable instructions further cause the hardware processor to adjust the color values of the modified image frame to a lighter hue.

20. The non-transitory computer-readable medium of claim 15, wherein to adjust the contrast and the brightness of the modified image frame, the executable instructions further cause the hardware processor to restore the contrast to the initial value of the contrast and restoring the brightness to the initial value of the brightness.

* * * * *

UNITED STATES PATENT AND TRADEMARK OFFICE
CERTIFICATE OF CORRECTION

PATENT NO. : 10,118,097 B2
APPLICATION NO. : 15/283071
DATED : November 6, 2018
INVENTOR(S) : Karen Elaine Stevens Page 1 of 2

It is certified that error appears in the above-identified patent and that said Letters Patent is hereby corrected as shown below:

In the Specification

Column 2, Line 45, after "thereof" insert --.--.

Column 10, Line 19, change "pro tanopia," to --protanopia,--.

In the Claims

Column 15, Line 51, in Claim 5, after "of" insert --at least a portion of--.

Column 15, Line 56, in Claim 6, after "of" insert --at least a portion of--.

Column 15, Line 57, in Claim 6, change "colors" to --color values--.

Column 15, Line 60, in Claim 7, after "of" insert --at least a portion of--.

Column 16, Line 42, in Claim 12, change "modify" to --adjust--.

Column 16, Line 43, in Claim 12, after "of" insert --at least a portion of--.

Column 16, Line 47, in Claim 13, change "claim 12," to --claim 8,--.

Column 16, Line 48, in Claim 13, change "the color shifted representation of" to --at least a portion of--.

Column 16, Line 48, in Claim 13, after "the" insert --modified--.

Column 16, Line 50, in Claim 13, change "colors" to --color values--.

Column 18, Line 5, in Claim 18, change "modify" to --adjust--.

Signed and Sealed this
Twenty-seventh Day of August, 2019

Andrei Iancu
*Director of the United States Patent and Trademark Office*

Column 18, Line 6, in Claim 18, after "of" insert --at least a portion of--.

Column 18, Line 18 (approx.), in Claim 20, after "of" insert --at least a portion of--.